United States Patent [19]

Filbert

[11] Patent Number: 5,304,742
[45] Date of Patent: * Apr. 19, 1994

[54] STRAIN RELIEF DEVICE

[75] Inventor: Jacques Filbert, Longueuil, Canada

[73] Assignee: Leviton Manufacturing Co., Inc., Little Neck, N.Y.

[*] Notice: The portion of the term of this patent subsequent to Aug. 15, 2006 has been disclaimed.

[21] Appl. No.: 927,247

[22] Filed: Aug. 7, 1992

Related U.S. Application Data

[63] Continuation of Ser. No. 615,208, Nov. 19, 1990, abandoned, which is a continuation of Ser. No. 510,372, Apr. 17, 1990, abandoned, which is a continuation of Ser. No. 364,734, Jun. 12, 1989, abandoned, which is a continuation of Ser. No. 269,844, Nov. 19, 1988, abandoned, which is a continuation of Ser. No. 170,491, Mar. 10, 1988, abandoned, which is a continuation of Ser. No. 764,121, Aug. 12, 1985, Pat. No. 4,857,674.

[51] Int. Cl.$^5$ .................. H02G 15/007; H02G 3/22
[52] U.S. Cl. ................ 174/135; 174/153 G; 248/56; 248/222.3; 24/458
[58] Field of Search .............. 174/135, 153 G, 138 D; 248/27.1, 56, 73, 222.3, 239; 439/546, 548; 403/353; 24/59.1, 458

[56] References Cited

U.S. PATENT DOCUMENTS

| 789,734 | 5/1905 | Hochhausen | 439/546 |
|---|---|---|---|
| 2,626,773 | 1/1953 | Backman | 248/222.3 X |
| 2,826,388 | 3/1958 | Janos et al. | 248/239 |
| 2,940,558 | 6/1960 | Schlueter | 248/222.3 X |
| 3,235,219 | 2/1966 | Green | 248/222.3 X |
| 3,443,783 | 5/1969 | Fisher | 248/222.3 X |
| 3,559,152 | 1/1971 | Pearce, Jr. | 439/548 |
| 3,880,396 | 4/1975 | Freiberger et al. | 24/591 X |
| 3,910,536 | 10/1975 | Sharp et al. | 174/138 D X |
| 4,131,258 | 12/1978 | Okuda et al. | 248/73 |
| 4,216,930 | 8/1980 | Rossler, Jr. et al. | 174/153 G X |
| 4,527,760 | 7/1985 | Salacuse | 248/222.3 X |
| 4,857,674 | 8/1989 | Filbert | 174/135 |

FOREIGN PATENT DOCUMENTS

| 1465768 | 5/1969 | Fed. Rep. of Germany | 174/135 |
|---|---|---|---|
| 2273967 | 1/1976 | France | 403/353 |
| 2520654 | 8/1983 | France | 81/176.2 |

Primary Examiner—Leo P. Picard
Assistant Examiner—Hyung S. Sough
Attorney, Agent, or Firm—Paul J. Sutton

[57] ABSTRACT

The invention features a strain relief device for mounting wires and cable into a panel. The body of the device carrying the cable is flexible and attached to the panel by a rotational motion. The panel is locked between two flange sections of the body by a number of locking ramps that bias one of the flanges into locking engagement with the panel.

3 Claims, 5 Drawing Sheets

STRAIN RELIEF DEVICE

This application is a continuation of application Ser. No. 615,208, filed Nov. 19, 1990 and now abandoned. Application Ser. No. 615,208 is a continuation of application Ser. No. 510,372 filed Apr. 17, 1990 and now abandoned. Application Ser. No. 510,372 is a continuation of application Ser. No. 364,734, filed Jun. 12, 1989 and now abandoned. Application Ser. No. 364,734 is a continuation of application Ser. No. 269,844 filed Nov. 9, 1988 and now abandoned. Application Ser. No. 269,844 is a continuation of application Ser. No. 170,491 filed Mar. 10, 1988 and now abandoned. Application Ser. No. 170,491 is a continuation of application Ser. No. 764,121, filed Aug. 12, 1985 and which issued as U.S. Pat. No. 4,857,674 on Aug. 15, 1989.

FIELD OF THE INVENTION

The invention features a strain relief device for installation of wire and cable into panelling, and more particularly to a flexible strain relief device that is easily mountable in a panel and which can accommodate a variety of wire and cable.

BACKGROUND OF THE INVENTION

In mounting power supply cords and other electrical wires or cables in a panel, it is necessary to install them such that strain is not imposed upon the copper conductors and the surrounding insulation. The stressing of wires or cables at their points of contact with panelling can lead to serious shorting or disruption of the electrical current.

In the past, a strain relief device was utilized to alleviate cable stresses, wherein the device housing was the cable threaded into the panelling. While the threaded strain relief device protected the wires, it was too cumbersome and costly to install.

The present invention features a new strain relief design that quickly and easily mounts to a panel, and which has the further advantage of accommodating wires, cords and cables of varying types, materials, and construction. The strain relief device of this invention will provide good retention of the wires subject to both normal and torsional forces applied at the entry point in the panel.

BRIEF SUMMARY Of THE INVENTION

The invention relates to a flexible strain relief device for installing wire or cable into a square aperture disposed in panelling. The device comprises a flexible body having a wire or cable supporting conduit. The entrance of the conduit is disposed at a rear portion. First and second flange sections are situated at the rear portion of the body. These flange sections are approximately square in shape. The flange sections are spaced apart by at least a thickness of the panelling, and have an approximate 45 degree orientation with respect to each other, i.e. the flange sections are displaced at an angle of 45 degrees about a central body axis.

The strain relief device is inserted in the square aperture of the panelling by orienting the body at approximately 45 degrees with respect to an' upright position, i.e. at a 45 degree angle about the central body axis. In this position, the first flange section will pass through the square aperture. The strain relief device is then rotated approximately 45 degrees back to the upright position, wherein the first flange section becomes locked behind the panelling. The panelling is now disposed between the first and second flange sections.

The first flange section has chamfered corners that allow the flange section to pass through the square aperture in the panelling at a 45 degree orientation, but become locked in the upright position.

A number of ramps disposed along a front portion of the first flange section bias the strain relief device into locking engagement with the panelling. Each ramp is disposed about a corner of the first flange section. The front portion of the first flange section is disposed oppositely a rear portion of the second flange section, so that the panelling will become locked between the two flange sections.

A pair of holes in the body receive the teeth of a torquing tool for rotating the body of the strain relief device with respect to the panelling.

It is an object of the invention to provide an improved strain relief device;

It is another object of this invention to provide a strain relief device that is easy to install and can accommodate many different wire, cord, and cable types.

These and other objects of the invention will become more apparent and will be better understood with respect to the following detailed description considered in conjunction with the accompanying drawings.

DETAILED DESCRIPTION OF THE INVENTION

Generally speaking, the invention pertains to a strain relief device for mounting wires or cables to a panel.

For the sake of brevity, like elements will be assigned the same designation throughout the drawings.

Figure 1:
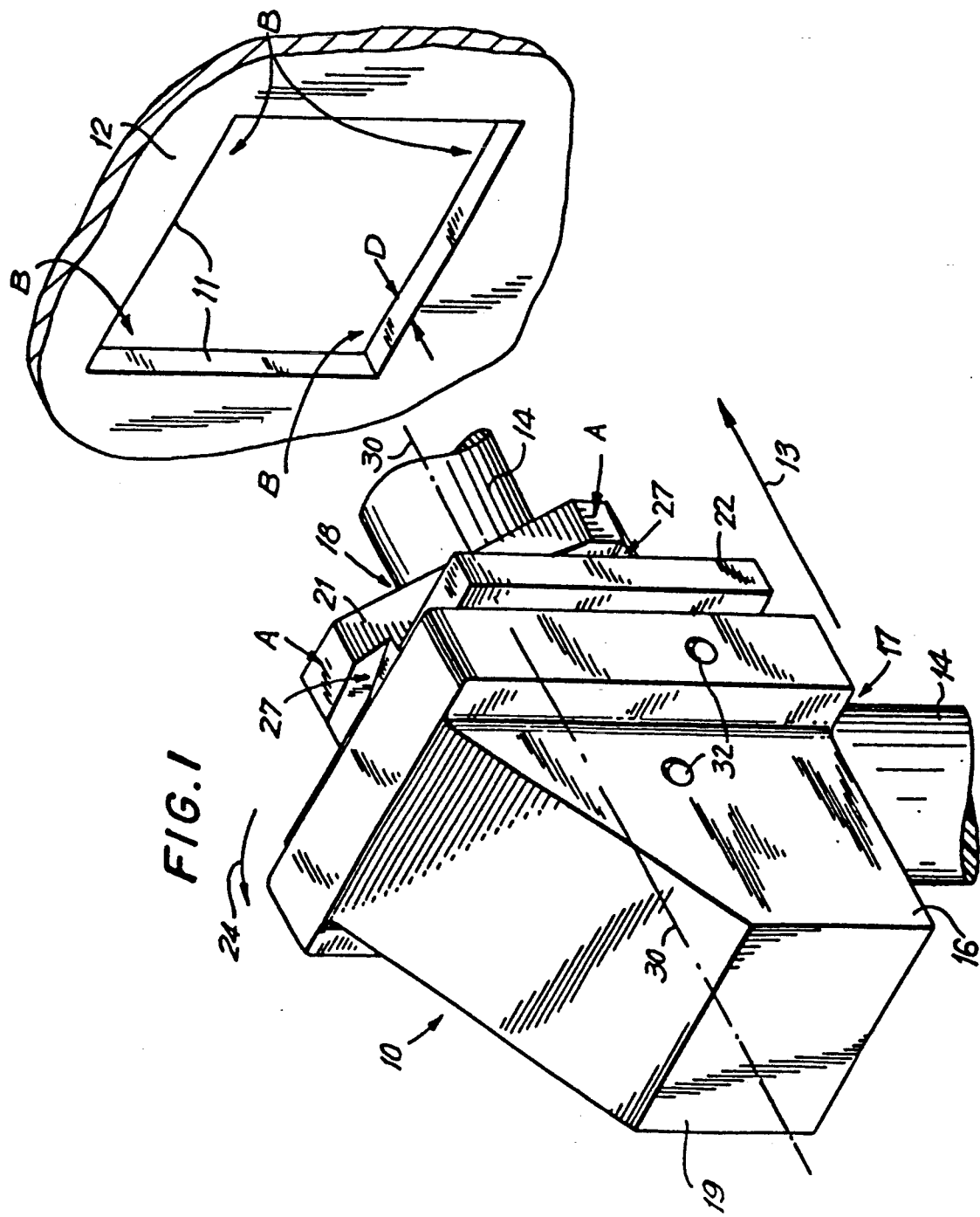
FIG. 1 is a perspective view of the strain relief device of this invention, and the square aperture of a panel into which the device is inserted.
Figure 2:
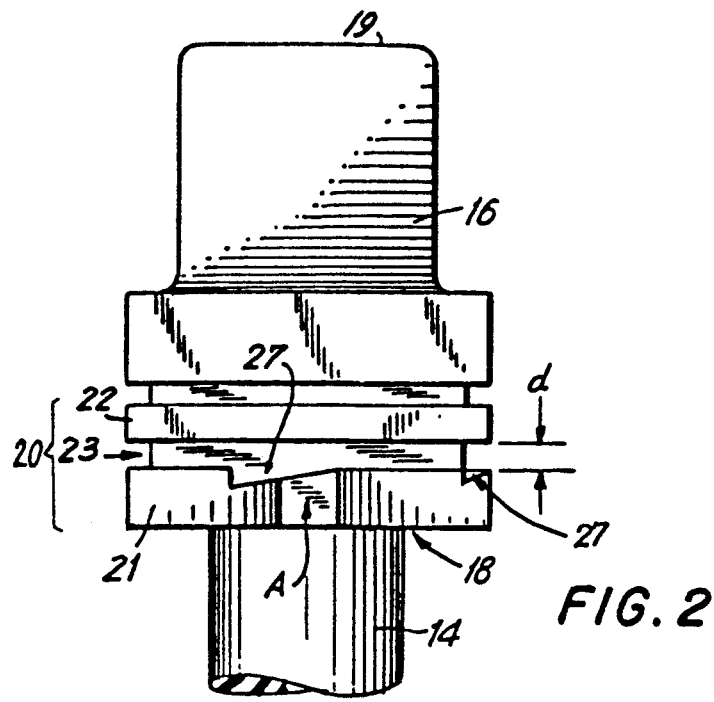
FIG. 2 is a top view of the strain relief device of FIG. 1, with a cable disposed therein.

Referring now to the figures, and particularly to FIG. 1, a strain relief device 10 of this invention is illustrated in an upright position with respect to a square aperture 11 in a panel 12 into which it is to be inserted (arrow 13).

The strain relief device 10 is made of a flexible material such as hard rubber, and carries a cable 14 in a conduit 15 (FIG. 8) running through its one-piece body 16, from a bottom entrance 17 to a rear exit 18.

The body 16 of device 10 has a snubbed-nose section 19 for protecting the cable 14 from shock forces.

Figure 8:
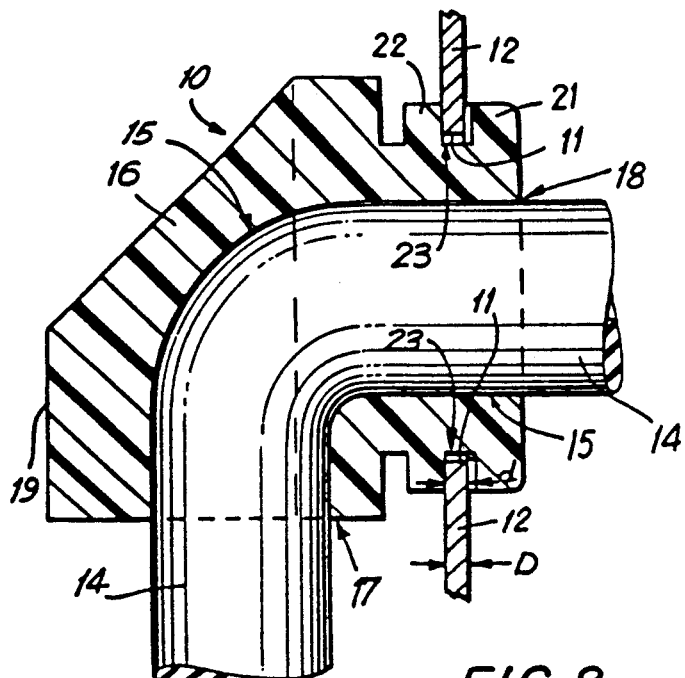
FIG. 8 is a sectional side view of the strain relief device of FIG. 1 in a mounted position on the panelling.
Figure 9:
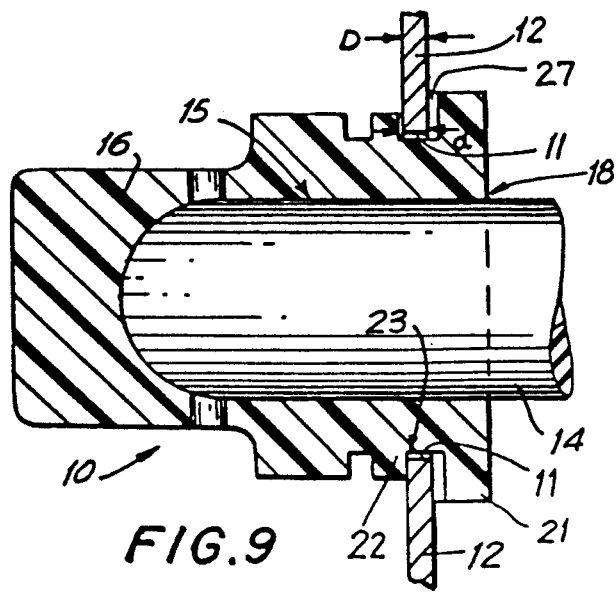
FIG. 9 is a sectional bottom view of the strain relief device depicted in FIG. 8.

The rear portion 20 of body 16 has two flanges 21 and 22, respectively. The flanges 21 and 22 are separated by a groove 23 having a thickness "d" of equal or slightly greater thickness than the thickness "D" of plate 12, as best seen in FIGS. 8 and 9. FIGS. 8 and 9 illustrate the device 10 mounted to plate 12.

Figure 3:
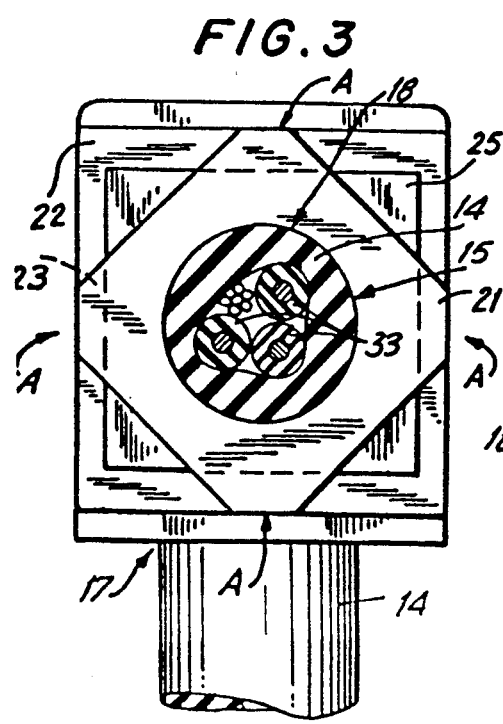
FIG. 3 is a back view of the strain relief device of FIG. 2, with a sectional cut shown through a cable disposed therein.
Figure 4:
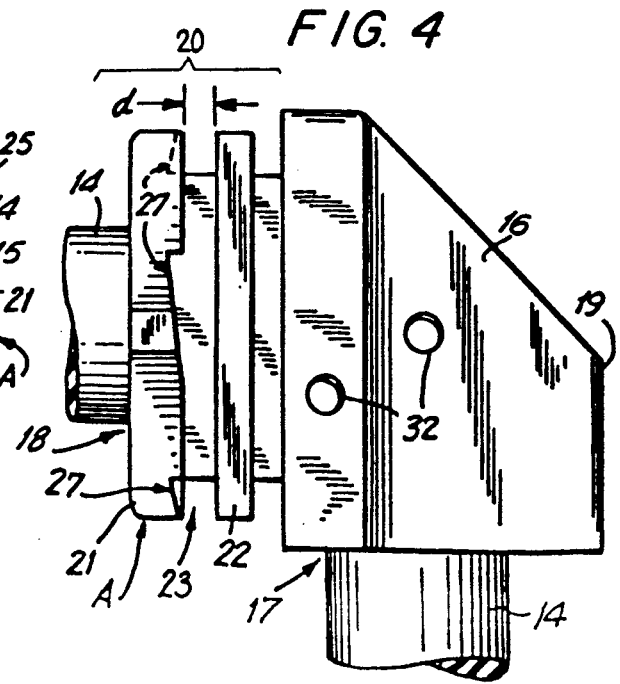
FIG. 4 is a left side view of the strain relief device of FIG. 2.
Figures 5, 6:
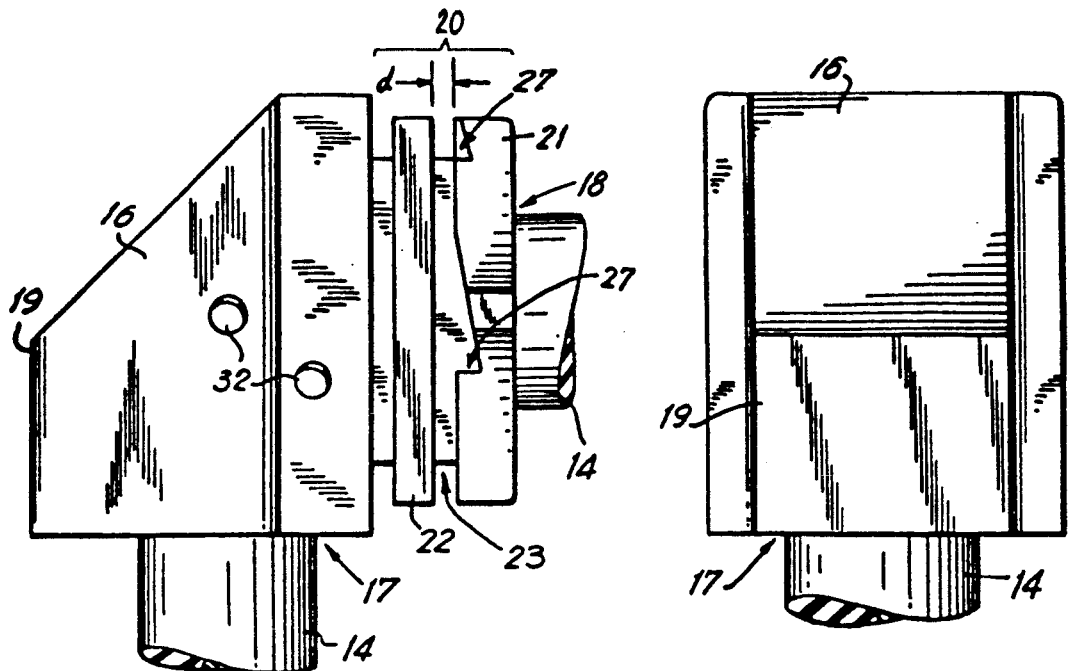
FIG. 5 is a right side view of the strain relief device of FIG. 2.
FIG. 6 is a front view of the strain relief device of FIG. 2.
Figure 10:
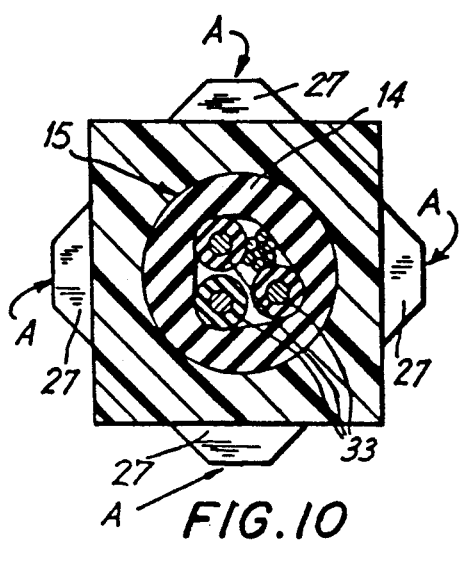
FIG. 10 is a front sectional view of the strain relief device illustrated in FIG. 8, taken between the rear flange sections.
Figure 11:
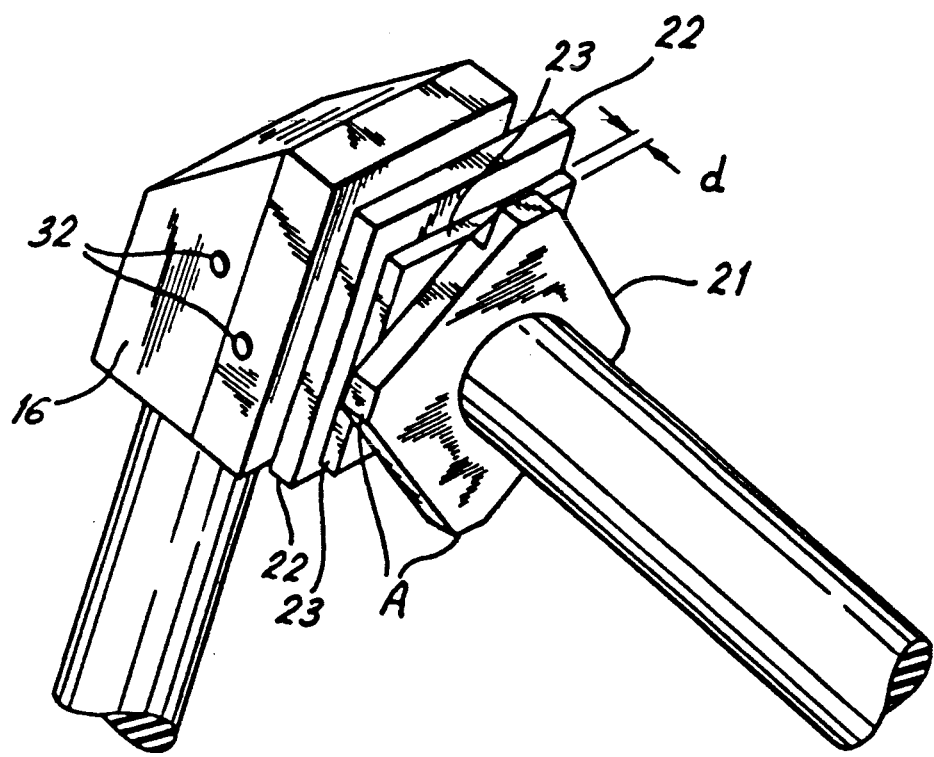
FIG. 11 is a perspective rear view of the strain relief device of the invention.

Flanges 21 and 22 are approximately square-shaped, except that the corners "A" of flange 21 are chamfered to, give an octagonal appearance, as best seen in FIGS. 3, 10 and 11.

When the device 10 is to be inserted into (arrow 13) aperture 11 of plate 12 (FIG. 1), it is necessary to rotate (arrow 24) the body 16 from its illustrated upright position, and push (arrow 13) flange 21 into aperture 11.

At an angle of 45 degrees counterclockwise about center axis 30, the chamfered corners A of flange 21 will clear the corner sections "B" of aperture 11, and allow the flange 21 to pass behind plate 12.

If the body 16 is now rotated back to its upright position (45 degrees clockwise), the corners A of flange 21 will lock into place behind plate 1.2, thus attaching the strain relief device 10 to plate 12. In this locked position, the plate 12 is disposed in groove 23 between the flanges 21 and 22, respectively, and the square spacer portion 25 is located in the square aperture 11, thus preventing the strain relief device from rotating.

A locking fit is insured by means of ramps 27 cut into corners A of flange 21, which provided camming leverage between the plate 12 and flange 21, when the body 16 is rotated 45 degrees clockwise to the upright position shown in FIG. 1.

Holes 32 may be provided in body 16 for receipt of a torquing tool (not shown) for rotating the body 16 about axis 30 in a clockwise direction.

Figure 7:
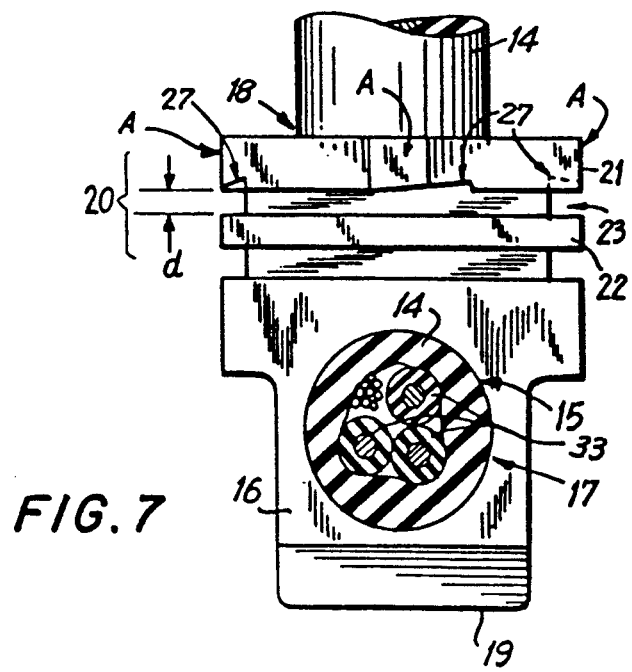
FIG. 7 is a bottom view of the strain relief device of FIG. 2, with a sectional cut shown through the cable.

A typical cable 14 that con be used with device 10, con be a power cord having -three insulated conductors 33, as depicted in FIGS. 3, 7 and 10. Of course, the device 10 can also be utilized with other types of wire or cabling, as befits the need. Flat and square cordage can also be used with the inventive strain relief device. Appropriate modifications will occur to those skilled in this art.

Having thus described the invention, what is desired to be protected by Letters Patent is presented in the subsequently amended claims.

What is claimed is:

1. A flexible strain relief device for installing wire or cable into a square aperture disposed in a panelling plate comprising a flexible one piece body, said body having an entrance at a bottom portion thereof for a wire or cable supporting conduit, and said body having an exit for said conduit at a rear portion thereof, said body having first and second approximately square flange sections dispose at said rear portion, said flange sections being spaced apart by at least a thickness of said panelling plate and each having an orientation of approximately 45-degrees with respect to each other measured about a central axis in said body, wherein insertion of said strain relief device in said square aperture of said panelling plate is achieved by orienting said body at approximately 45-degrees with respect to an upright position such that said first flange section passes through said square aperture in said panelling plate, and then rotating said strain relief device approximately 45-degrees back to said upright position, wherein said first flange section becomes locked behind said panelling plate, and said panelling plate is disposed between said first and second flange section;

an approximately square spacer portion, at least as thick as the panelling plate and slightly smaller than the square aperture, located between said first and second flanges, said first flange and said spacer portion having an orientation of approximately 45-degrees with respect to each other as measured about a central axis in said body;

said first and second flange sections being separated by a groove having an equal to or slightly greater than the thickness of said plate, said groove extending from the periphery of said spacer portion to the peripheries of said first and second flange sections;

said body having a snubbed-nose portion comprising a top portion extending outward at a downward slope from said panelling plate when mounted thereon, and a bottom portion extending downward from said top portion in a direction substantially parallel to said panelling plate for protecting said wire or cable from shock forces;

a plurality of ramps, at the corners of said first flange, recessed within the surface that is facing the rearward surface of said second flange;

each ramp opening to a radial edge of said first flange for receiving said panelling plate, and to a radial edge of said spacer portion for delivering said panelling plate, and having its ramping surface angled such that camming forces upon said first and second flanges and said spacer portion are applied annularly and such that minimal force is applied on said first flange and said spacer portion corners radially toward the central axis, said spacer portion positioned in said square aperture in said panelling plate to prevent rotation of said strain relief after said strain relief is properly positioned in said square aperture.

2. The flexible strain relief device of claim 1, wherein said first flange section has a substantially square shape with corners thereof being chamfered so as to pass through said square aperture at approximately a 45 degree angle of orientation with respect to said upright position.

3. The flexible strain relief device of claim 1, wherein said body includes means defining a pair of holes for receiving teeth of a torquing tool for rotating said body with respect to said panelling.

* * * * *